(12) United States Patent
Sorensen et al.

(10) Patent No.: US 7,793,574 B2
(45) Date of Patent: Sep. 14, 2010

(54) MACHINE TOOL

(75) Inventors: David Loyd Sorensen, Sherwood, OR (US); Andrew Gordon Thompson, Canby, OR (US); Jeffrey Lee Jennings, Scotts Mills, OR (US); David Sylvan Strait, Lyle, WA (US)

(73) Assignee: Climax Portable Machine Tools Inc., Newberg, OR (US)

( * ) Notice: Subject to any disclaimer, the term of this patent is extended or adjusted under 35 U.S.C. 154(b) by 972 days.

(21) Appl. No.: 11/209,360

(22) Filed: Aug. 22, 2005

(65) Prior Publication Data

US 2007/0039440 A1 Feb. 22, 2007

(51) Int. Cl.
*B23B 3/26* (2006.01)

(52) U.S. Cl. .............................. 82/1.2; 82/123; 82/113; 82/131

(58) Field of Classification Search ................... 82/1.2, 82/1.4, 123, 113, 131, 172; 408/152, 153, 408/173, 178, 147; *B23B 5/06*
See application file for complete search history.

(56) References Cited

U.S. PATENT DOCUMENTS

| | | | |
|---|---|---|---|
| 2,842,238 A * | 7/1958 | Shaw et al. ................. | 409/179 |
| 4,114,483 A | 9/1978 | Grimsley | |
| 4,205,495 A | 6/1980 | Grimsley | |
| 4,250,778 A * | 2/1981 | Christoph ..................... | 82/128 |
| 4,387,612 A * | 6/1983 | Eckle et al. ................... | 82/131 |
| 4,411,178 A * | 10/1983 | Wachs et al. .................. | 82/113 |
| 4,463,633 A * | 8/1984 | Grimsley ..................... | 82/128 |
| 4,468,158 A | 8/1984 | Pearce | |
| 4,494,617 A * | 1/1985 | Snyder ........................ | 175/86 |
| 4,990,037 A | 2/1991 | Strait | |
| 5,012,710 A * | 5/1991 | D'Andrea et al. ............. | 82/1.2 |
| 5,178,643 A * | 1/1993 | Schimweg .................... | 51/293 |
| 5,642,969 A | 7/1997 | Strait | |
| 5,678,464 A | 10/1997 | Way | |
| 5,775,188 A | 7/1998 | Strait | |
| 5,954,462 A * | 9/1999 | Way et al. .................... | 408/153 |
| 6,050,159 A * | 4/2000 | Kress et al. ................... | 82/1.2 |
| 2001/0018012 A1 * | 8/2001 | Harmand et al. ............ | 408/1 R |

OTHER PUBLICATIONS

Paul H. Black, "Harmonic Speed Changer," in AccessScience@McGraw-Hill, http://www.accessscience.com, DOI 10.1036/1097-8542,308800, last modified May 13, 2002.

* cited by examiner

*Primary Examiner*—Boyer D Ashley
*Assistant Examiner*—Sara Addisu
(74) *Attorney, Agent, or Firm*—Schwabe Williamson & Wyatt

(57) ABSTRACT

A lightweight, compact, machine tool for radially machining a surface is provided, where the machine tool includes a cutting head having a cutter movably coupled thereto, and the cutter is further coupled to a control member such that the control member can variably control radial movement of the cutter relative to the cutting head.

17 Claims, 5 Drawing Sheets

MACHINE TOOL

TECHNICAL FIELD

Embodiments of the present invention relate generally to machine tools, and more particularly to a machine tool adapted to radially machine surfaces that are difficult to reach with conventional tools.

BACKGROUND

Often, components having surfaces in need of machining are configured such that the surface is hard to reach. Thus machining these surfaces to prolong the life of the component is difficult. One such component having surfaces that need to be machined are valves typically found on submarines, ships and the like, which are welded inline with piping. These valves have seat surfaces that corrode or wear while in service. These seats have to be re-machined and built up with shims to restore the sealing surface.

The current repair method involves using a portable right angle machine tool that is mounted to the cover flange of the valve with a rotating cutter axially aligned with the seat. The cutter has a small fixed thread feed screw that is activated by a star wheel with a trip arm so that a cutter mounted on a cutter head incrementally moves radially as the cutter head is rotated. The feed rate cannot not be varied by the operator, as the star wheel geometry and lead screw pitch are fixed. Such incremental advancement does not allow for variably controlling the radial advancement of the cutter, which may be beneficial for surfacing operations.

The current repair equipment has the rotating cutter driven by a gear train comprising of multiple idler gears. This arrangement is heavy and bulky, especially on machines for servicing larger valves.

After the cutter reaches its maximum radial travel, the star wheel must be manually rotated in the opposite direction to return the cutter to its starting point for a second cut. This is typically accomplished by using a small rod threaded through a hole in the mounting plate and slowly manipulating the star wheel in the reverse direction. This time-consuming retraction effort can have a significant impact on the efficiency of the machining process.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF ILLUSTRATIVE EMBODIMENTS OF THE INVENTION

Figure 1:
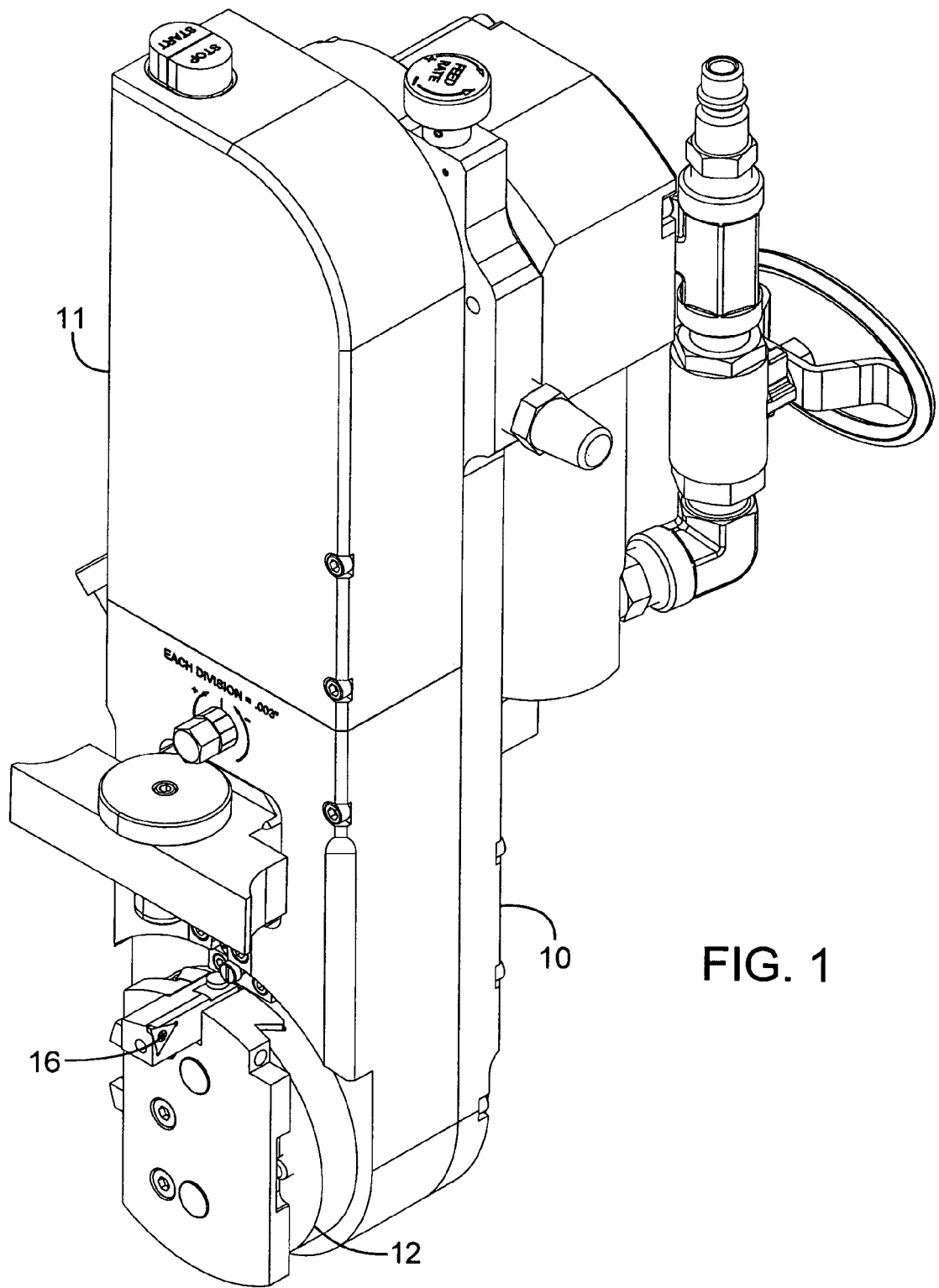
FIG. 1 is perspective view illustrating one embodiment of the invention.

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made in alternate embodiments. Therefore, the following detailed description is not to be taken in a limiting sense, and the scope of embodiments in accordance with the present invention is defined by the appended claims and their equivalents.

The phrase "in one embodiment" is used repeatedly. The phrase generally does not refer to the same embodiment; however, it may. The terms "comprising," "having," and "including" are synonymous, unless the context dictates otherwise. The following description may also include terms such as inner, outer, under, between, upward, downward, outward, inward, top, bottom, above, below and the like. Such terms are used for descriptive purposes only and are not to be construed as limiting in the description or in the appended claims. That is, these terms are terms that are relative only to a point of reference and are not meant to be interpreted as limitations but are, instead, included in the following description to facilitate understanding of the various aspects of the invention.

Embodiments of the invention may provide a machine tool having a variably controlled cutter that is suitable for use in confined spaces, and may be used, for example, as a valve seat resurfacing tool. Embodiments of the invention may provide variable control of the radial advancement of the cutter with respect to a cutting head, which may result in the ability to control the amount of material that is removed over a given period. For example, to remove a desired amount of material, one or two passes taking a significant amount of material may be made at higher rates. If, for example, the surface finish is an issue, then the final pass may be done by removing a lesser amount of material at a slower pace to ensure a good surface finish. Such variable control of the radial advancement of the cutter may result in time and cost savings, prolong the life of the tool and/or the cutting edge, and yield a more accurate and reliable surface finish.

One embodiment, according to the invention may provide an arrangement having a compact design which allows for a light weight machine that may be positioned in confined spaces such as a valve.

One embodiment of the invention may provide the ability to rapidly retract the cutter radial position without having to stop the rotary motion of the machine cutter or without requiring special interlocks that prevent the feed and retract actions from being simultaneously engaged by the operator.

In one embodiment of the present invention, the primary components used to achieve this variably controlled radial extension and retraction of the cutter include a cutting head itself which has a cutter adapted to move radially outward from the cutting head. In one embodiment, the cutter may be coupled to a rack which may in turn be configured to mesh with a pinion driven by a pinion drive shaft. The entire cutting head may be rotated by a drive mechanism that may be coupled to a drive source located partially outside of the component being machined (e.g., external to a valve). The drive mechanism may be coupled to the drive source through a linkage such as gearing, a belt, or other coupling mechanism. The pinion drive shaft may be controllably rotated in order to variably extend the cutter via the rack and pinion connection.

Coupled to the pinion shaft may be a variable control member that is adapted to allow the pinion shaft to differentially rotate with respect to the cutter head and the drive head. Where the control member is not causing the pinion shaft to rotate at a rate that is different than the rate of the cutting head, then there will be no advancement of the rack by the pinion, and thus no radial advancement of the cutter.

As the control member causes the pinion shaft to rotate at a rate that is different than the cutter head, then there will be radial advancement or retraction of the cutter by virtue of the movement between the rack and pinion. In one embodiment, the variable control member may be a wheel having protrusions or indentations (e.g., vanes) disposed about its circumference. These vanes may act as positive stops for an engaging member that will cause the control member to stop or dwell for a determined period of time, thereby causing the differential rotation of the pinion with respect to the cutting head.

A number of different drive arrangements may be used to couple the control member to the pinion shaft in order to help to variably control the rotation of the pinion shaft with respect to the cutter head. One such suitable drive arrangement may be a flexible spline drive, which may also be referred to as a "harmonic drive mechanism" such as that made by Harmonic Drive Systems Inc. Flexible spline drives may be useful due to their space efficiency and their ability to achieve large reduction ratios and/or increases in output torque. Examples of harmonic drive mechanisms are set forth in, for example, in U.S. Pat. Nos. 4,823,638 and 4,974,470.

Another drive arrangement may include, for example, a planetary gearing mechanism having a clutch as the control member to engage and disengage the planetary gears. Yet another drive arrangement may be selected such that the pinion tends to rotate with the cutting head, for example, gear arrangements with a sufficiently high input to output ratios such that frictional forces would tend to keep them aligned. Various control members may be used to effect a relative movement between the pinion and the cutting head with such gear arrangements.

While the control member may be adapted to variably control the radial advancement of the cutter, it may also be adapted to enable rapid retraction of the cutter. In one embodiment, once the cutting head has been fully extended to the desired stop location (i.e., the outer edge of the valve seat surface) the radial cutter can be radially retracted by causing the control wheel to rotate at a rate that is faster than the cutting head. This differential rate will cause the pinion to engage the rack such that the cutter is retracted. Where the control member is a wheel having vanes disposed about its circumference, for example, an air stream may be directed across the vanes of the control wheel in a jet-like fashion to cause the control wheel to turn at a faster rate than the cutter and cause retraction of the cutter.

Figure 2:
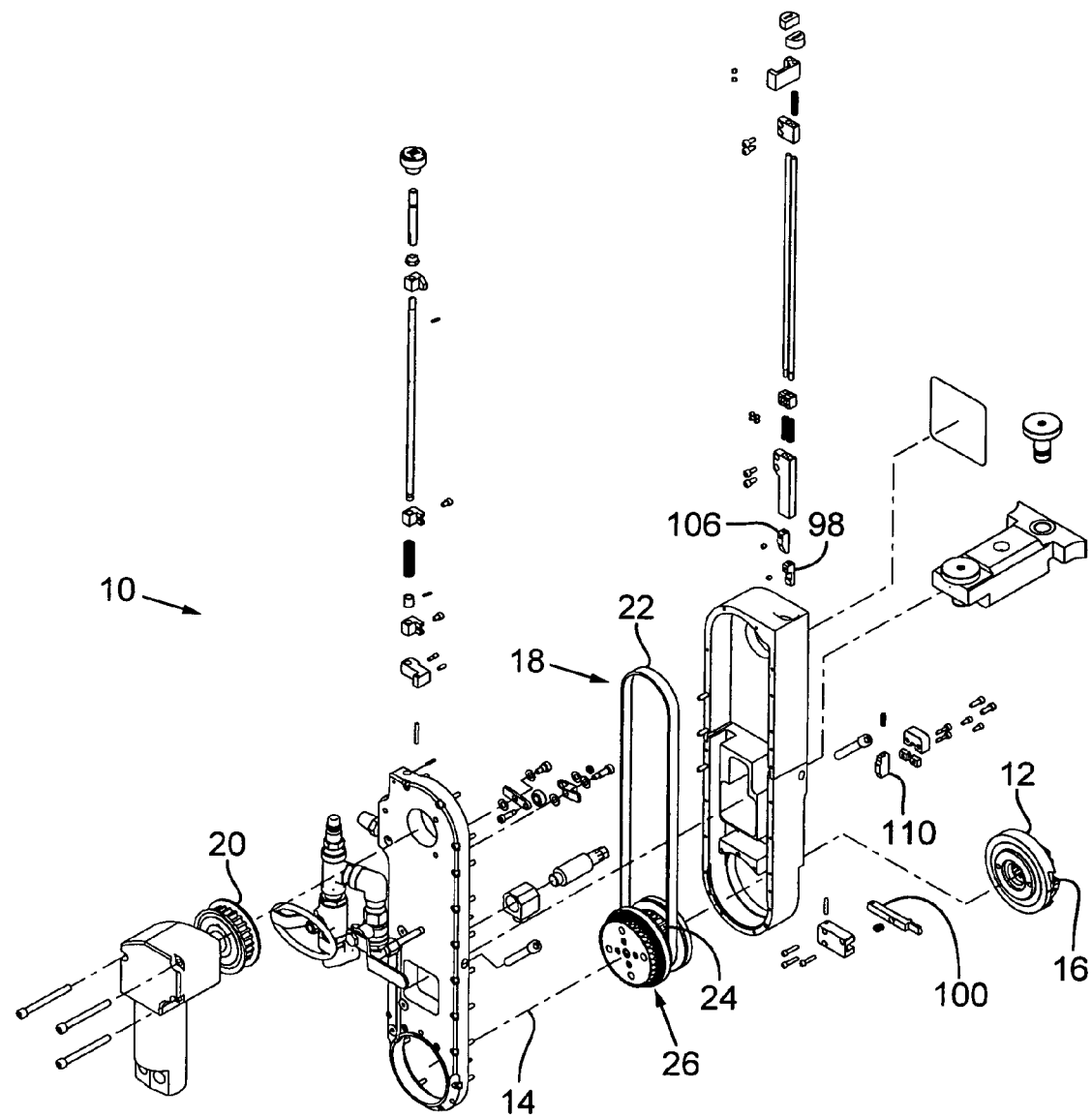
FIG. 2 is a reverse exploded view illustrating one embodiment of the invention.

FIG. 1 is perspective view and FIG. 2 is a reverse exploded view Illustrating one embodiment in accordance with the present invention. Machine tool 10, includes a housing 11, and may be configured to radially machine a surface. Cutting head 12 may be adapted to rotate about a cutting central axis 14, and include a cutter 16, which may be adapted to move radially relative to the cutting head 12. The cutter 16 may also be adapted to rotate about axis 14 with the cutting head 12. A primary drive mechanism 18 may be adapted to drive the cutting head 12 for rotation. The drive mechanism 18 may include a driving gear 20, which may be a sprocket, pulley, or other device coupled to a driven gear 24, which may also be a gear, or a pulley, or the like. Driving gear 20 may be coupled to driven gear 24 by belt 22, which may also be a chain, gear train, or other linkage. The driven gear 24 may be part of a lower spindle assembly 26.

Figure 3:
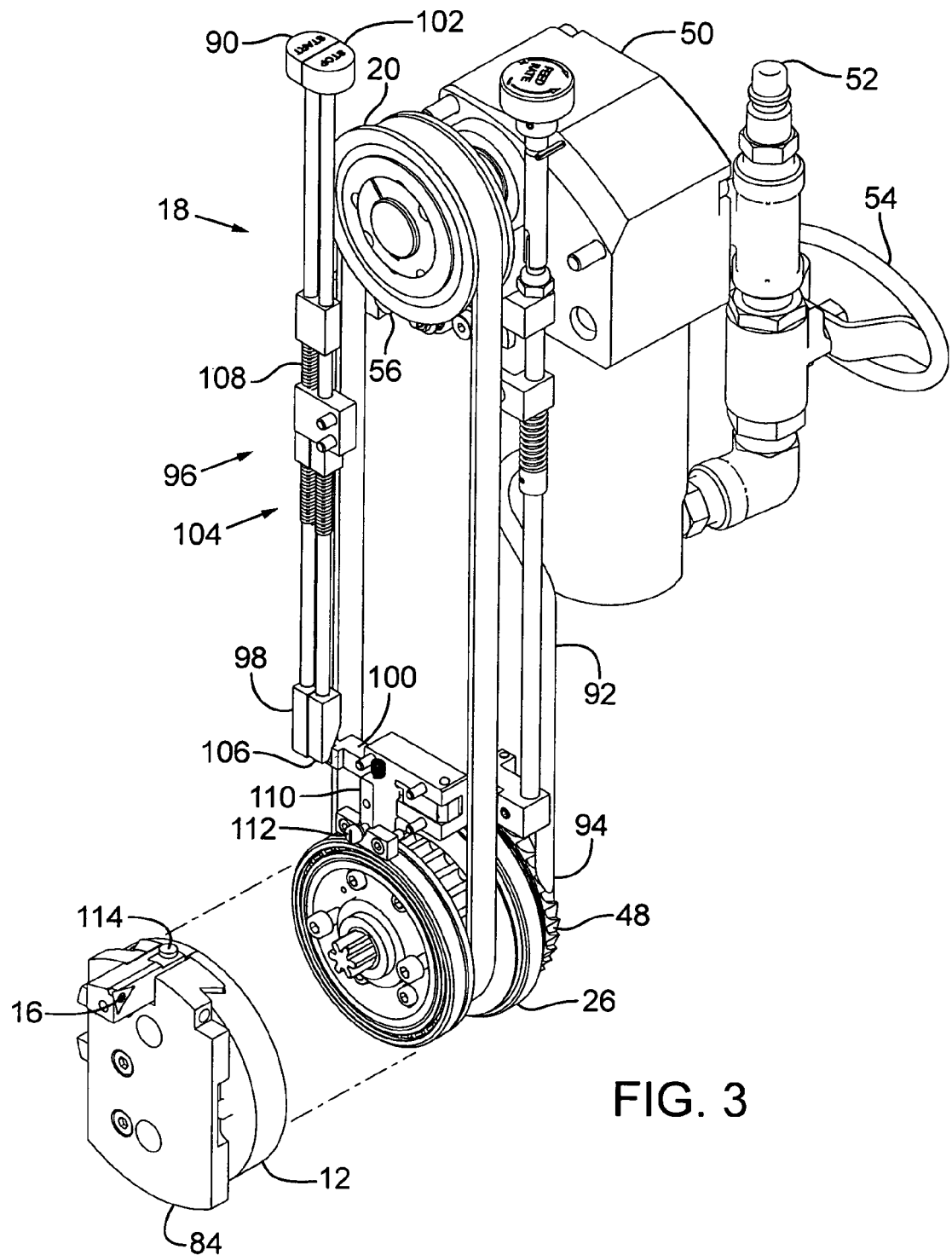
FIG. 3 is a perspective view with parts removed for illustration, illustrating the embodiment shown in FIGS. 1 and 2.
Figure 4:
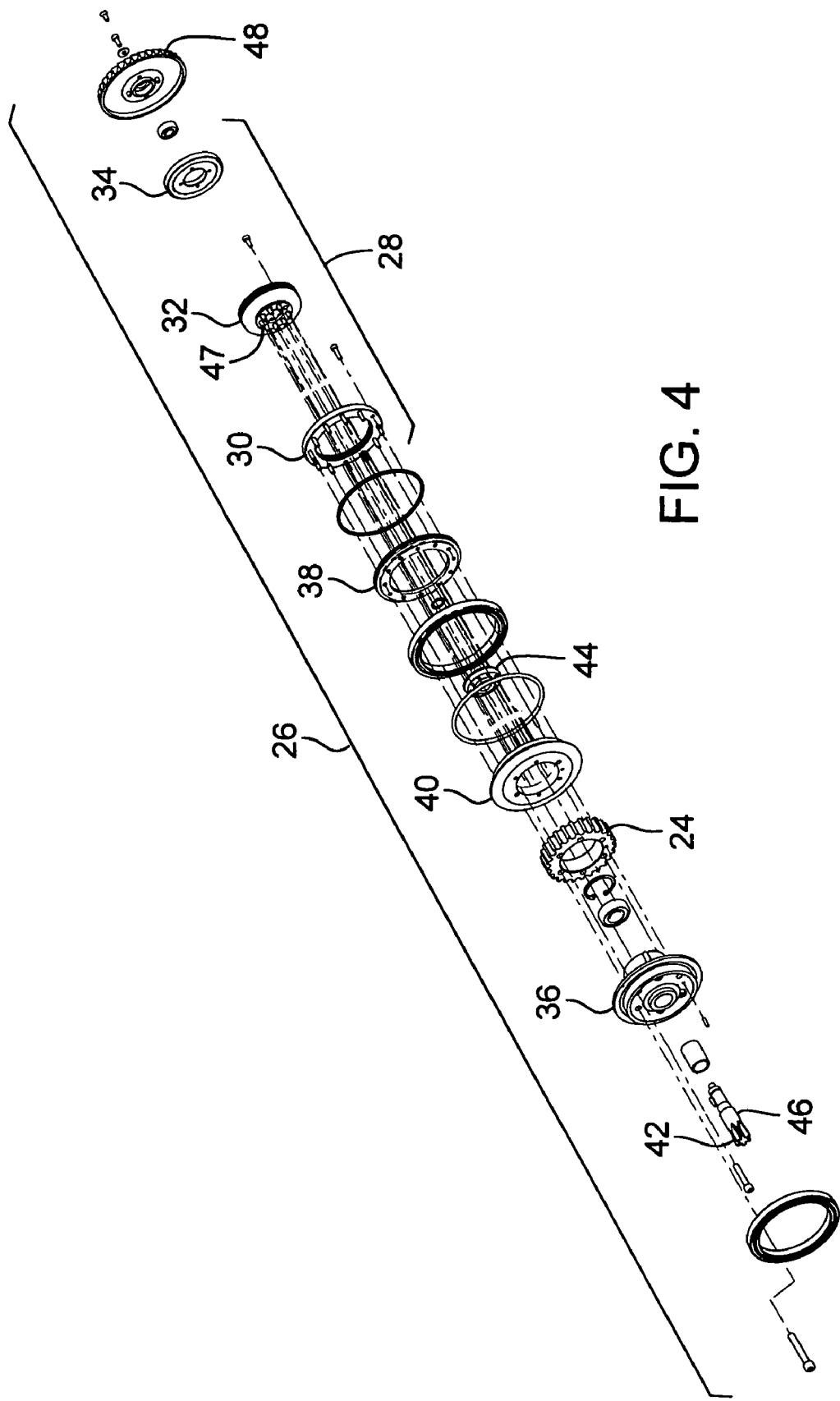
FIG. 4 is an exploded assembly view of the lower spindle assembly 26 of the embodiment shown in FIGS. 1 and 2.

FIG. 3 is a perspective view of the embodiment shown in FIGS. 1 and 2 with parts removed for illustration. FIG. 4 is an exploded assembly view of the lower spindle assembly 26, of the embodiment shown in FIGS. 1 and 2. In one embodiment, the lower spindle assembly 26 may include a pinion shaft driving member that is a flexible spline drive 28, which may be used to variably control the movement of the cutter 16 relative to cutting head 12. The flexible spline drive 28 may include a rigid circular spline 30 with internal teeth configured to fit over a flex spline 32 and an elliptical wave generator 34. The rigid circular spline 30 may be coupled to a spindle hub 36 via a retainer 38, and hub flange 40. The spindle hub 36 may be adapted to couple to the cutting head 12 by for example bolts, screws, or pins. Cutting head 12 may be adapted for rotational driving by virtue of this coupling to spindle hub 36, driven gear 24, and hub flange 40.

The flex spline 32 may be adapted to couple to a pinion gear 42 by way of a pinion drive flange 44 and a pinion shaft 46. For example, studs 47 on the flex spline 32 may be adapted to couple to the drive flange 44, and the pinion shaft 46 may be keyed to the drive flange 44. The elliptical wave generator 34 may be disposed within the flex spline 32. Friction between the wave generator 34, the flex spline 32, and the circular spindle 30 may tend to keep the pinion gear 42 rotating at the same rate as the cutting head 12 absent any external input.

A control member in the form of a vaned disk 48 may be coupled to the wave generator 34. The vaned disk 48 may be adapted to provide input to the flexible spline drive and may be used to variably control the relative movement between the flex spline 32 and the circular spline 30. As discussed herein, relative movement between the flex spline 32 and the circular spline 30 may cause the differential rate that can effect radial movement of the cutter 16 relative to the cutting head 12.

Figure 6:
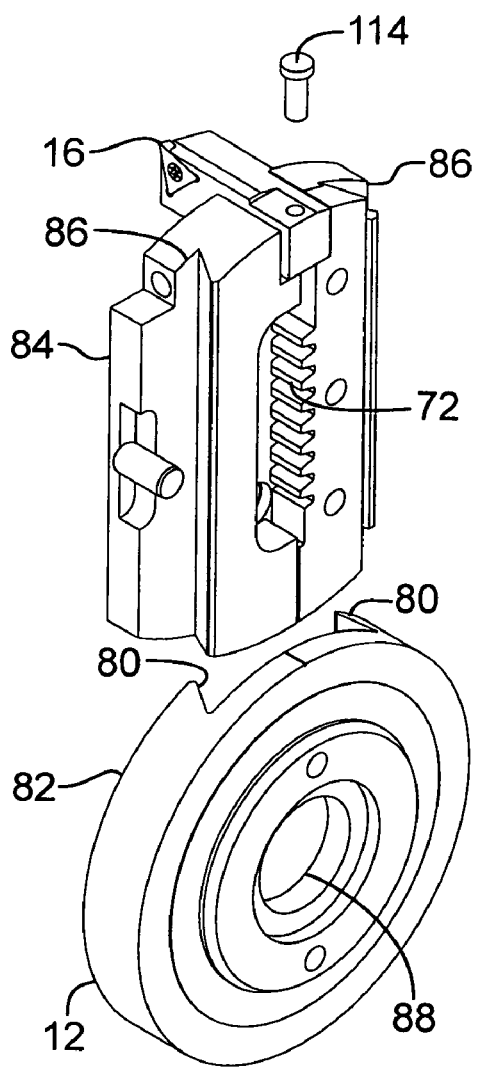
FIG. 6 is an exploded assembly view of the cutting head of the embodiment shown in FIGS. 1 and 2.

FIG. 6 illustrates a perspective view of the cutting head according to one embodiment of the present invention. The cutting head 12 may include a dovetail portion 80 disposed on a first side 82 thereof. The cutting head 12 may include a central aperture 88, which may be adapted to allow the pinion gear and pinion shaft to pass through. A cutter slide 84 may include corresponding cutter slide dove tails 86 adapted to slidingly engage the dovetails 80. The cutter 16 may be coupled to the cutter slide 84. Rack 72 may be disposed in cutter slide 84, and adapted to mesh with pinion gear 42 protruding through aperture 88. Accordingly, as pinion gear 48 rotates at a different rate than cutting head 12, the pinion gear 48 will act on the rack and cause the cutter slide to move radially inward or outward, which in turn will radially advance or retract the cutter 16.

In operation, the machine tool 10 may be positioned inside a difficult to reach location, for example, the inside of a valve. In the case of machining the inside of a valve, the tool axis 14 may be positioned along the central axis of, for example, a pipe along which the valve is installed. The cutter 16 may then be located axially within the material to be machined away. The machine tool 10 may be turned on by, for example, starting the drive motor 50, thereby causing the cutting head 12, and the cutter 16 to rotate. A start button 90 may be pressed to start the radial feed of cutter 16. A feed control knob 66 may be adjusted ahead of time, or during the machining process to variably adjust a feed rate of the cutter 16 radially into the material to be cut.

Referring to FIG. 3, in one embodiment of the invention, the machine tool 10 may be configured to provide for the rapid retraction of the cutter 16, which may be implemented at the end of, or at any time during, a machining operation. A duct 92 may be positioned to provides air to a nozzle 94. Nozzle 94 may be adapted to direct a stream of air, or other media, onto the vaned disk 48. The vane configuration and direction of the nozzle 94 may be adapted to cause the vaned disk 48 to rotate faster than it would otherwise rotate without any external influence acting thereon, thereby causing the wave generator 34 and flex spline to rotate the pinion shaft and pinion gear at a rate faster than that of the cutting head 12. This may thus cause cutter 16 to radially retract towards the center of the cutting head 12. The rapid retraction may greatly reduce the overall machining time. It can be appreciated, however, that the differential speed of the pinion with respect to the cutting head 12 may be switched, such that when the pinion gear is rotating slower than the cutting head, retraction of the cutter will result.

Figure 5:
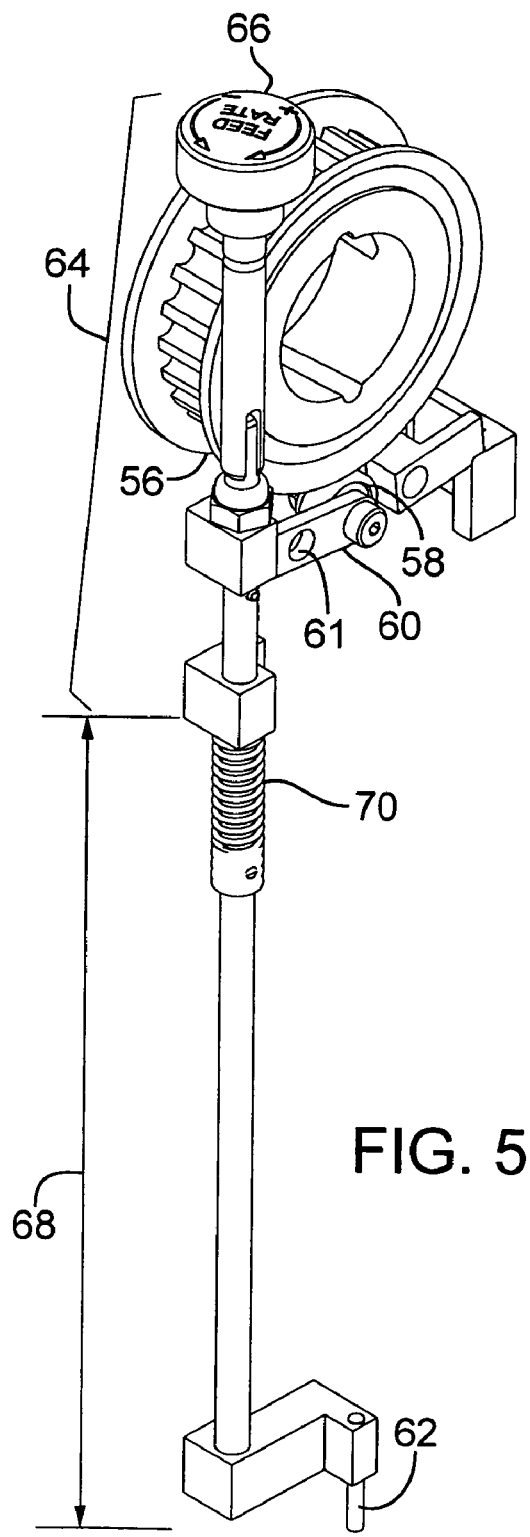
FIG. 5 is a perspective view illustrating details of the embodiment shown in FIGS. 1 and 2 with parts removed for illustration.

FIG. 5 illustrates a perspective view of a mechanism that may act upon the control member in accordance with an embodiment of the present invention. Referring to FIG. 3, drive mechanism 18 may be driven by, for example, a pneumatic, or air, motor 50 configured to be coupled with the driving gear 20. A compressed air source may be attached to an input 52 and controlled with a valve 54. The driving gear 20 may include an eccentric surface 56 or a cam on at least one rim thereof. The eccentric surface 56 may ride on a follower 58 disposed on a rocker arm 60, and adapted to pivot on a support (not shown) coupled to the housing and to fit in hole 61 of rocker arm 60. The rocker arm 60 may be connected to a rod assembly with a bottom end thereof connected to a dwell rod 62.

As the driving gear 20 rotates the eccentric surface 56 causes the follower 58 and in turn the rocker arm 60 and dwell rod 62 to move up and down with each rotation of the driving gear 20. The dwell rod 62 may be adapted to contact the vaned disk 48 of the control member. The length of time the dwell rod 62 contacts the vaned disk 48 is determined by an adjustment configuration 64, which includes a feed control knob 66 that when rotated adjusts a distance 68. A compression spring 70 biases the dwell road 62 downward.

Each time the dwell rod 62 contacts one or more vanes on the control mechanism, the control mechanism and in turn the wave generator 34 will stop rotating. The flex spline 32 will then rotate relative to the rigid circular spindle 30 causing the pinion to rotate relative to a rack 72 (discussed herein) on the cutting head 12 and moving the cutter 16 relative the cutting head 12.

It can be appreciated that any number of devices may be adapted to act upon the control member any variety of ways. For example, a manually actuatable rod may be adapted to contact the control member and cause a dwell time determined by the operator. In one embodiment the control member may be acted upon by electrical, pneumatic or hydraulic mechanisms to cause dwelling or over speeding motion.

In one embodiment, the machine tool 10 may be configured with an automatic shutoff feature. The start button 90 may be connected to a rod configuration 96 having a latch 98 at the bottom thereof. The latch 98 is configured to latch onto a pivot arm 100 arranged to pivot about a vertical axis. In the latched position the machine tool 10 is configured to run. A stop button 102 is connected to a rod arrangement 104 having a wedge 106 at a bottom thereof. Upon pushing the stop button the wedge will cause the pivot arm 100 to pivot away from the latch causing the latch to unlatch. Spring 108 will then cause the start button to raise to the off position. In various embodiments, the machine tool 10 may include a trip mechanism to cause the machine tool 10 to stop machining upon reaching a preset radial position. The trip mechanism, in various embodiments, may include a block 110 which is also connected to the pivot arm 100, and includes a cam member 112 which may be a screw. The cutter slide 84 may include a set screw 114 which may be adjusted for fine adjustment. As the cutting head 12 rotates and the cutter slide 84 moves radially the set screw 114 will approach the cam member 112. When the set screw 114 contacts the cam member 112 it will push the block 110 into the pivot arm 100 causing the latch 98 to unlatch therefrom and putting the machine tool into the off position. The set screw may be adjusted to adjust a turnoff point.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A machine tool for radially machining a surface comprising:
   a cutting head;
   a cutter slide coupled to the cutting head, wherein the cutter slide is configured to move radially relative to the cutting head;
   a cutter slide actuator coupled to the cutter slide and disposed coaxially with the cutting head, wherein the cutter slide actuator is configured to produce radial movement of the cutter slide;
   a control member coupled to the cutter slide actuator and disposed coaxially with the cutting head, wherein the control member is configured to control the cutter slide actuator to produce the radial movement,
   a first drive configured to rotate the cutting head, the cutter slide, the cutter slide actuator, and the control member about a common axis at a first rate, wherein the cutter slide actuator produces no radial movement of the cutter slide while rotated at the first rate; and
   an engaging member operatively coupled to the control member, wherein the engaging member is configured to modify rotation of the control member and the cutter slide with respect to the first rate to variably control radial movement of the cutter slide while the cutting head is rotating at the first rate.

2. The machine tool of claim 1, wherein the cutter slide is in sliding engagement with the cutting head and comprises a rack configured for engagement with the cutter slide actuator.

3. The machine tool of claim 1, wherein the engaging member is periodically actuated by an eccentric.

4. The machine tool of claim 1, wherein the control member is adapted to increase rotation of the cutter slide actuator with respect to the first rate to generate the modified rotation and radially retract the cutter slide.

5. The machine tool of claim 1, where in the engaging member includes a dwell rod adapted to oscillate according to a cam profile, and an adjustment mechanism to adjust a length of time the dwell rod acts on the control member.

6. The machine tool of claim 1, wherein the control member includes a wheel configured to be variably stopped by the engaging member, whereby the stopping of the wheel causes cutter to move radially outward with respect to the cutting head.

7. The machine tool of claim 6, wherein the wheel includes a vaned periphery, a fluid source configured to act on the vaned periphery in order to cause the wheel to rotate at a faster rate than the first rate.

8. The machine tool of claim 1, where in the control member is coupled to the cutter slide actuator through a flexible spline drive.

9. The machine tool of claim 8, wherein the flexible spline drive includes a flexible spline, a rigid spline and a wave generator; and wherein
the control member is coupled to the wave generator;
the rigid spline is fixed relative the cutting head; and
the wave generator acts on the flexible spline to cause the flexible spline to move relative to the rigid spline, thereby causing the cutter slide actuator to rotate at a rate that is less than the first rate.

10. The machine tool of claim 1, wherein the control member is configured to radially retract the cutter slide when rotated at a rate faster than the cutting head.

11. A machine tool for machining a surface comprising:
a cutting head configured to rotate at a first rate;
a cutter slide coupled to the cutting head, wherein the cutter slide includes a cutter and is radially movable relative the cutting head;
an interengagement between the cutter slide and the cutting head to variably control radial movement of the cutter slide, wherein the interengagement is disposed coaxially with the cutting head;
a control member, coupled to the interengagement and disposed coaxially with the cutting head, wherein the control member is adapted to control the interengagement while the cutting head, the cutter slide, the interengagement, and the control member are rotated at the first rate; and
a engager configured to engage the control member to modify rotation of the control member, wherein the modified rotation of the control member controls the interengagement to produce radial movement of the cutter slide.

12. The machine tool of claim 11, wherein the control member is configured to retract the cutter slide radially toward a center of the cutting head at a retract rate, wherein the retract rate is faster than the first rate.

13. The machine tool of claim 11, wherein the interengagement is a rack and pinion.

14. The machine tool of claim 13, wherein the control member is configured to receive a periodic input from the engager to move the pinion relative the rack.

15. The machine tool of claim 14, wherein the periodic input is variable.

16. The machine tool of claim 11, wherein the cutter slide includes a trip mechanism to cause the machine tool to stop machining upon reaching a preset radial position.

17. The machine tool of claim 11, wherein the interengagement is coupled to a flexible spline drive, the flexible spline drive including a wave generator, the control member configured to be coupled to the wave generator.

* * * * *